US009052575B2

(12) United States Patent
Chang et al.

(10) Patent No.: US 9,052,575 B2
(45) Date of Patent: Jun. 9, 2015

(54) DETERMINING CORRESPONDENCE MAPPINGS FROM INFRARED PATTERNS PROJECTED DURING THE PROJECTION OF VISUAL CONTENT

(75) Inventors: Nelson Liang An Chang, San Jose, CA (US); Niranjan Damera-Venkata, Mountain View, CA (US); Simon Widdowson, Dublin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2446 days.

(21) Appl. No.: 11/776,796

(22) Filed: Jul. 12, 2007

(65) Prior Publication Data
US 2009/0015791 A1 Jan. 15, 2009

(51) Int. Cl.
G03B 21/14 (2006.01)
G03B 21/00 (2006.01)
G06K 9/20 (2006.01)
G06T 3/00 (2006.01)
G06T 11/00 (2006.01)
G06K 9/32 (2006.01)

(52) U.S. Cl.
CPC ........ *G03B 21/00* (2013.01); *G06K 9/20* (2013.01); *G06T 3/00* (2013.01); *G06T 3/0056* (2013.01); *G06T 11/006* (2013.01); *G06T 11/001* (2013.01); *G06T 3/005* (2013.01); *G06K 2009/3291* (2013.01)

(58) Field of Classification Search
CPC .... G06K 9/20; G06K 2009/3291; G06T 3/00; G06T 3/005; G06T 3/0056; G06T 11/006
USPC .......... 359/630; 348/370, 164; 353/28, 6, 69, 353/94
See application file for complete search history.

(56) References Cited

U.S. PATENT DOCUMENTS

| 4,679,068 A * | 7/1987 | Lillquist et al. ................. 348/33 |
| 5,870,136 A | 2/1999 | Fuchs et al. |
| 6,559,883 B1 * | 5/2003 | Fancher et al. ............... 348/164 |
| 6,811,267 B1 * | 11/2004 | Allen et al. ................... 353/122 |
| 2003/0142883 A1 * | 7/2003 | Ishii ............................. 382/284 |
| 2004/0222987 A1 * | 11/2004 | Chang et al. .................. 345/419 |
| 2004/0245430 A1 * | 12/2004 | Konishi ..................... 250/201.2 |
| 2006/0115160 A1 * | 6/2006 | Jung et al. .................... 382/199 |
| 2006/0122515 A1 * | 6/2006 | Zeman et al. ................. 600/473 |
| 2006/0192925 A1 | 8/2006 | Chang |
| 2006/0291014 A1 * | 12/2006 | Hirata et al. .................. 358/504 |
| 2007/0046924 A1 | 3/2007 | Chang |
| 2007/0268398 A1 * | 11/2007 | Raskar et al. ................. 348/370 |
| 2008/0285056 A1 * | 11/2008 | Blayvas ....................... 356/603 |
| 2010/0177169 A1 * | 7/2010 | Saric ............................ 348/51 |

OTHER PUBLICATIONS

Raskar et al., "The Office of the Future: A Unified Approach to Image-Based Modeling and Spatially Immersive Displays", Computer Graphics Proceedings, 1998, pp. 1-10.

(Continued)

*Primary Examiner* — Georgia Y Epps
*Assistant Examiner* — Kevin Wyatt
(74) *Attorney, Agent, or Firm* — Dicke, Billig & Czaja, PLLC

(57) ABSTRACT

A method performed by a display system is provided. The method includes projecting a first infrared pattern from a first projection plane of a first projector into a scene, capturing the first infrared pattern from the scene in a capture plane of at least one image capture device, and determining a first correspondence mapping between the first projector and the image capture device from at least the first infrared pattern in the first projection plane and the first infrared pattern in the capture plane.

19 Claims, 5 Drawing Sheets

(56) References Cited

OTHER PUBLICATIONS

Cotting et al., "Adaptive Instant Displays: Continuously Calibrated Projections Using Per-Pixel Light Control", Eurographics 2005, vol. 24, No. 3.

Grundhofer et al., "Coded Projection and Illumination for Television Studios", Eurographics 2007, vol. 26, No. 3.

Cotting et al., "Embedding Imperceptible Patterns into Projected Images for Simultaneous Acquisition and Display", IEEE Computer Society, 0-7695-2191-6/04.

* cited by examiner

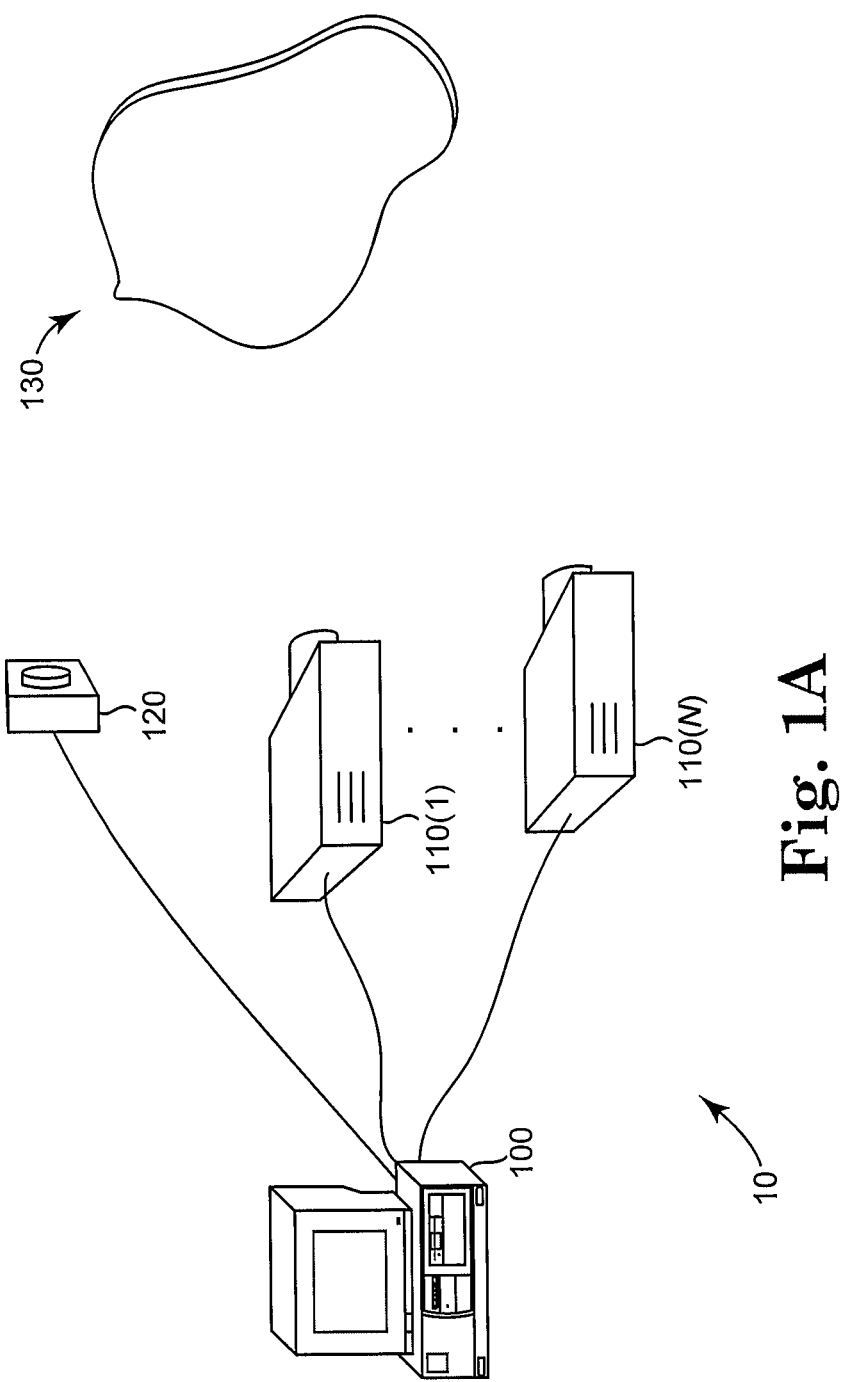

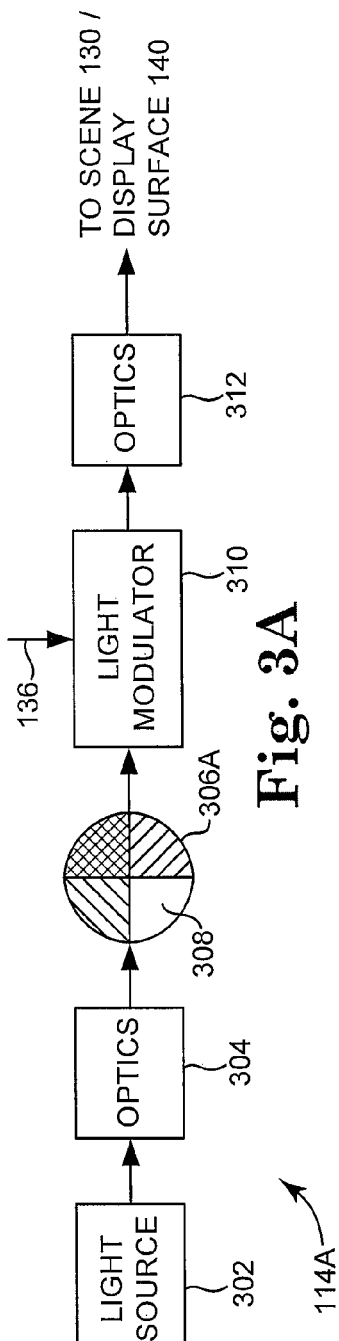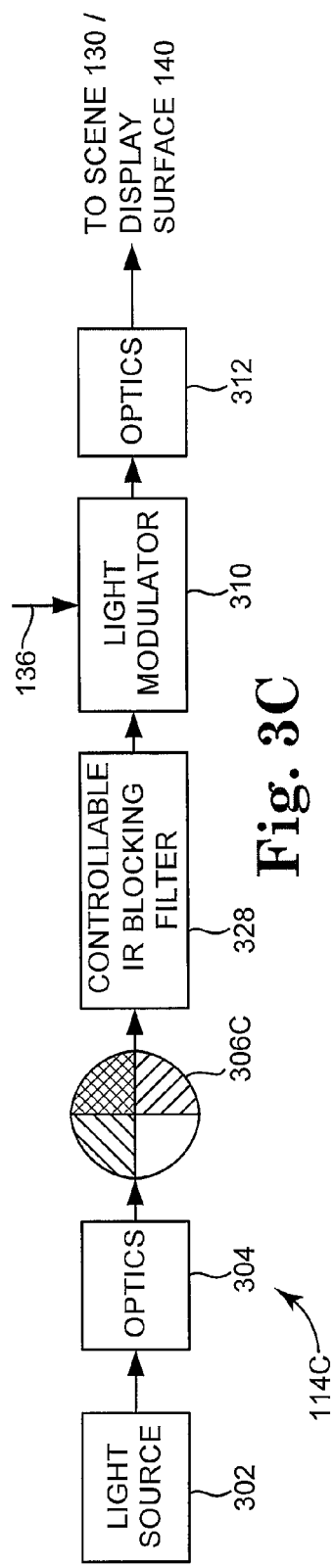

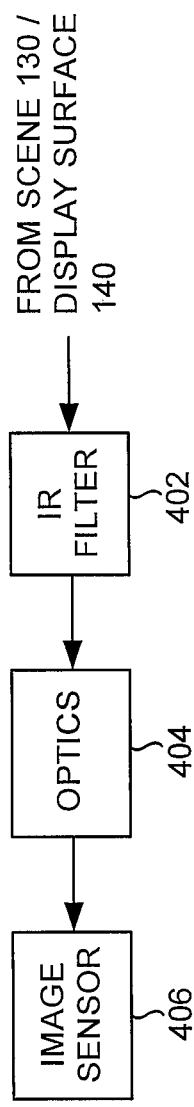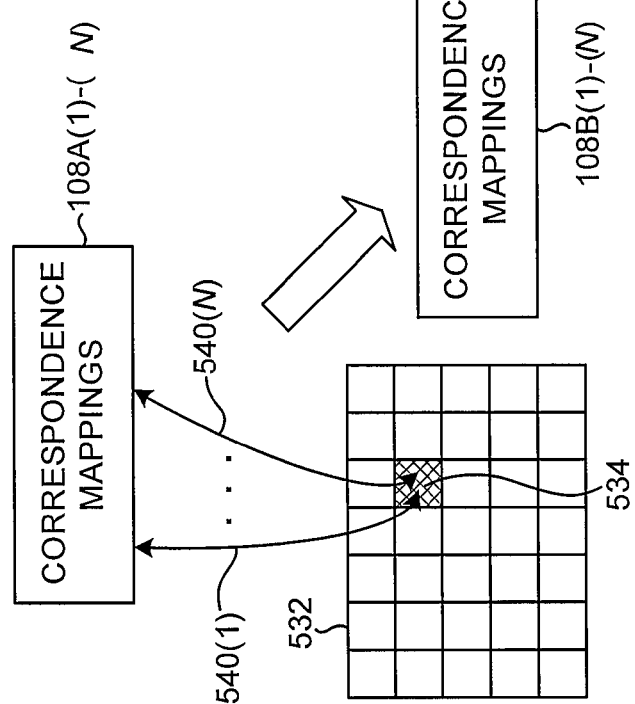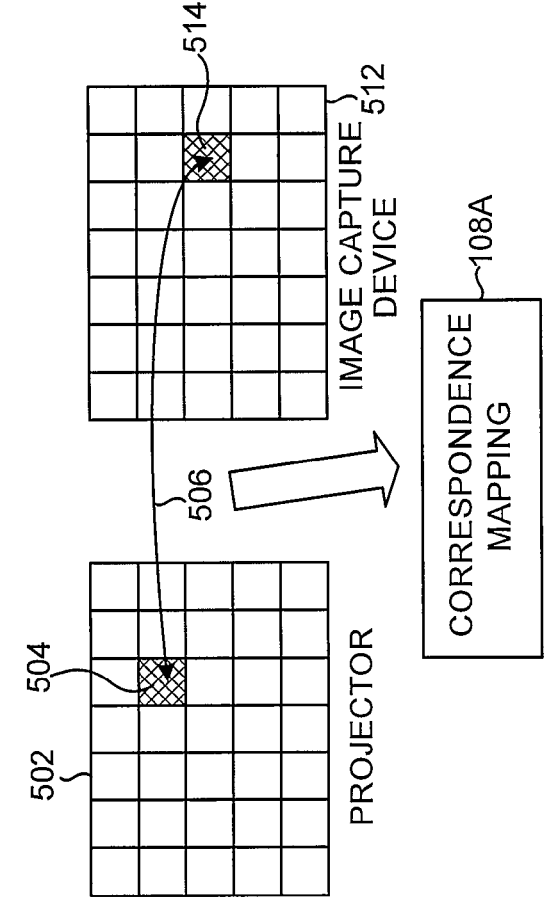

DETERMINING CORRESPONDENCE MAPPINGS FROM INFRARED PATTERNS PROJECTED DURING THE PROJECTION OF VISUAL CONTENT

CROSS-REFERENCE TO RELATED APPLICATION

This application is related to U.S. Patent Publication 2006/0192925, filed Feb. 28, 2005, and entitled MULTI-PROJECTOR GEOMETRIC CALIBRATION; and U.S. Patent Publication 2007/0046924, filed Aug. 30, 2005, and entitled PROJECTING LIGHT PATTERNS ENCODING CORRESPONDENCE INFORMATION. These applications are incorporated by reference herein.

BACKGROUND

In display systems, such as digital light processor (DLP) systems and liquid crystal display (LCD) systems, it is often desirable to include information in displayed images that is usable by the display system or another electronic device for geometric calibration or other purposes. With many display systems, however, information that is included into displayed images may be seen by a viewer. The information may detract from the viewer's enjoyment of the displayed images. It would be desirable to be able to include information in visual images formed by a display system where the information is at least substantially imperceptible by a viewer.

SUMMARY

According to one embodiment, a method performed by a display system is provided. The method includes projecting a first infrared pattern from a first projection plane of a first projector into a scene, capturing the first infrared pattern from the scene in a capture plane of at least one image capture device, and determining a first correspondence mapping between the first projector and the image capture device from at least the first infrared pattern in the first projection plane and the first infrared pattern in the capture plane.

BRIEF DESCRIPTION OF THE DRAWINGS

FIGS. 1A-1B are block diagrams illustrating embodiments of an image display system that is configured to generate correspondence mappings using infrared patterns.

FIGS. 3A-3C are block diagrams illustrating embodiments of an infrared generation unit.

FIG. 4 is a block diagram illustrating an embodiment of an image capture device configured to capture infrared patterns.

FIG. 5 is a schematic diagram illustrating the determination of a correspondence mapping using infrared patterns.

FIG. 6 is a schematic diagram illustrating the remapping of correspondence mappings to a reference coordinate system.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., may be used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As described herein, a system and method for determining correspondence mappings in an image display system is provided. For each projector in the image display system, the system projects infrared patterns into a scene with a projector and captures the infrared patterns with an image capture device. A correspondence mapping is determined between a projector plane of the projector and a capture plane of the image capture device using at least the projected and captured infrared patterns. The correspondence mappings may be remapped to a reference coordinate system.

Because the infrared patterns are substantially invisible to a human observer, the infrared patterns may be projected while projecting other visual content. Accordingly, the image display system may perform a calibration process during normal operation without generating substantial distortion in a scene viewed by a human observer.

Figure 1B:
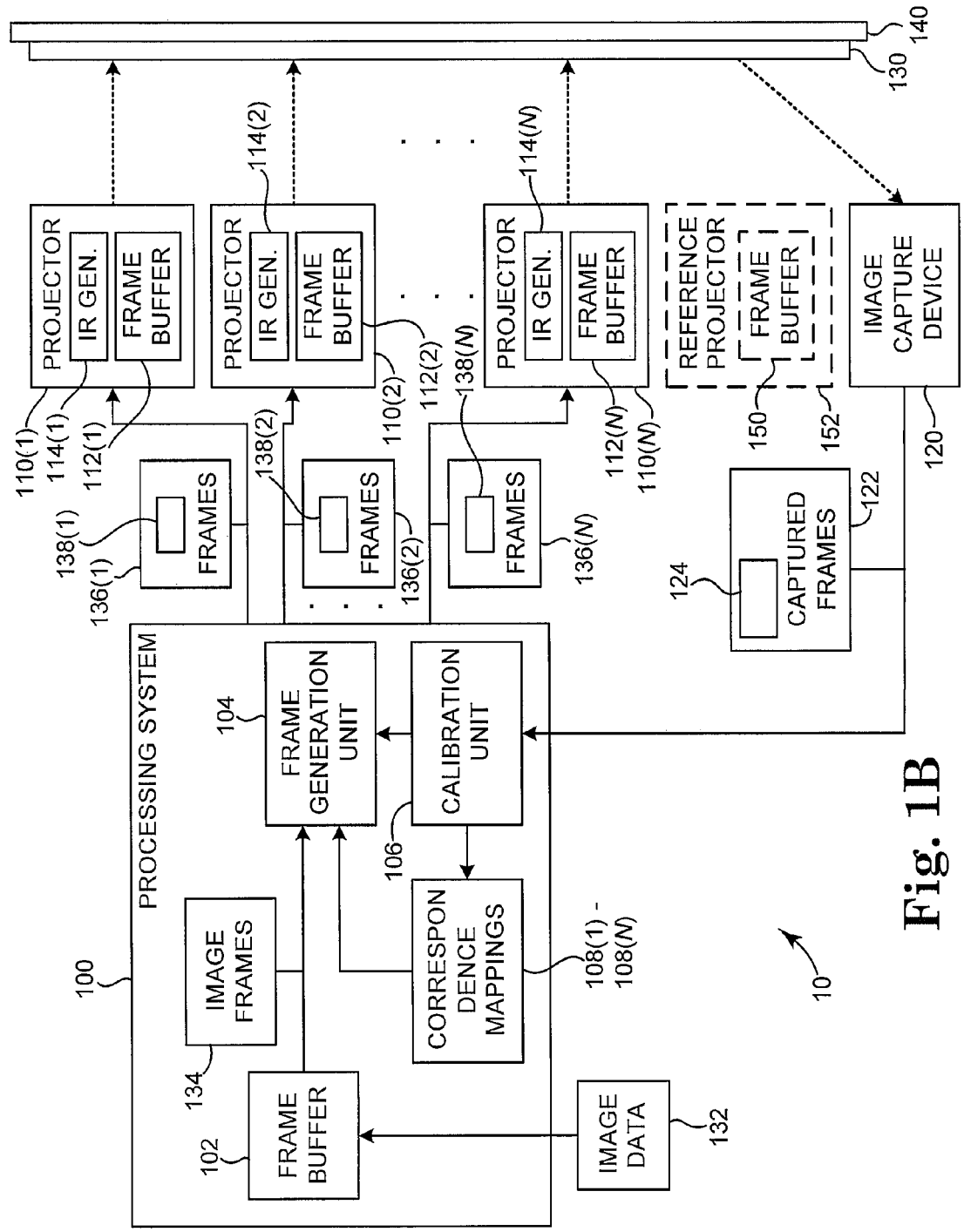

FIGS. 1A-1B are block diagrams illustrating embodiments of an image display system 10. Image display system 10 includes an image processing system 100, a set of projectors 110(1)-110(N) where N is an integer that is greater than or equal to one, and at least one image capture device 120. Processing system 100 controls and coordinates the operation of projectors 110 which project images to form scenes 130 and image capture device 120 which captures frames 122 to include scenes 130.

Image display system 10 processes image data 132 and generates corresponding displayed scenes 130 using projectors 110. Each displayed scene 130 includes any combination of separate, tiled, partially overlapping, or fully overlapping images displayed by projectors 110. A scene 130 is defined to include any combination of pictorial, graphical, or textural characters, codes, illustrations, or other representations of information. A scene 130 may form a still image that is displayed on display surface 140 by one or more projectors 110 or may be one of a set of successive images in a video stream that is displayed on display surface 140 by one or more projectors 110. Scenes 130 may be displayed on any suitable surface or object or any suitable combination of surfaces and/or objects. In one embodiment, image display system 10 displays scenes 130 on a display surface 140. Display surface 140 may be planar, non-planar, or curved, for example.

To display scenes 130, frame buffer 102 in processing system 100 receives and buffers image data 132 to create one or more image frames 134. Each image frame 134 may include the entirety of the information used to create a scene 130 or may each represent a set of two or more frames that form a scene 130. Frame generation unit 104 processes each image frame 134 along with correspondence mappings 108(1)-108(N) to generate one or more frames 136(1)-136(N), respectively, for display by projectors 110(1)-110(N), respectively. Frames 136 each include any suitable arrangement of individual pixels that represent the set or a subset of an image frame 134. For example, frames 136 may include a single pixel or one or more columns and/or one or more rows of individual pixels that are arranged in a rectangular, hexagonal, non-uniform, or other suitable non-standard sampling arrangement.

In one embodiment, frame generation unit 104 attempts to determine appropriate values for frames 136 so that a displayed scene 130 produced by simultaneously projecting two or more frames 136 in at least partially overlapping and spatially shifted positions on display surface 140 is close in appearance to how a corresponding high-resolution image (e.g., a corresponding image frame 134) from which frames 136 were derived would appear if displayed directly.

Frame generation unit 104 causes frames 136(1)-136(N) to be provided projectors 110(1)-110(N), respectively. Projectors 110 receive respective frames 136 from processing system 100. A frame buffer 112 in each projector 110 buffers each successive frame 136. Projectors 110 simultaneously display frames 136 onto display surface 140 to form displayed scenes 130. Projectors 110 may each be any suitable type of projector such as a digital light processor (DLP) projector and a liquid crystal display (LCD) projector that include an infrared generation unit 114. Infrared generation unit 114 in each projector 110 is configured to generate light in the infrared spectrum (i.e., light with wavelengths between approximately 700 nm and 1 mm) to project infrared patterns 138 in frames 136 into scene 130.

Image display system 10 is configured to automatically determine correspondence mappings 108(1)-108(N) between projectors 110(1)-110(N), respectively, and image capture device 120. Correspondence mappings 108(1)-108(N) describe geometric relationships between projectors 110(1)-110(N), respectively, and reference coordinate system. Image display system 10 may use correspondence mappings 108 to align images from projectors 110 in scenes 130. By aligning the images in scenes 130, image display system 10 may generate a desired arrangement of separate images in scene 130, a seamless display of tiled images in a scene 130, and/or the appearance of higher resolution images by at least partially overlapping and spatially offsetting the images in scene 130.

Image display system 10 may determine correspondence mappings 108(1)-108(N) as part of a calibration process that occurs during the display of scenes 130 for viewing by a human observer. Image display system 10 may perform this calibration process continuously or periodically during operation to update correspondence mappings 108(1)-108(N). Image display system 10 may also determine correspondence mappings 108(1)-108(N) as part of a calibration process that occurs prior to displaying scenes 130 for viewing by a human observer.

For each projector 110, processing system 100 provides frames 136 with infrared patterns 138 to a projector 110 for display. Infrared patterns 138 may be any suitable light symbols that encode in space and/or time two-dimensional position information in the coordinate systems of projectors 110. These light symbols may be space-time codes, binary or infrared patterns, blobs, or fiducial marks, for example. In addition to infrared patterns 138, frames 136 may include content in the visual spectra in some embodiments. Projector 110 projects frames 136 using infrared generation unit 114 to display the infrared patterns in scene 130 using infrared light. Because the infrared patterns are displayed using infrared light, the patterns may be invisible or substantially invisible to a human observer of scene 130 and may not produce substantial distortion in scene 130. In response to control signals from processing system 100, image capture device 120 captures frames 122 to include infrared patterns 124 and provides frames 122 to processing system 100. Image capture device 120 may be any suitable image capture device or set of two or more image capture devices, such as one or more sensors or one or more digital cameras, that are configured to capture infrared patterns 124 in frames 122.

Calibration unit 106 in processing system 100 determines a correspondence mapping 108 between projector 110 and image capture device 120 from at least infrared patterns 138 in the projection plane of projector 110 and infrared patterns 124 in the capture plane of image capture device 120. Processing system 100 may also remap each correspondence mapping 108 to a reference coordinate system. The reference coordinate system may be any suitable coordinate system such as the coordinate system of the capture plane of image capture device 120, the coordinate system of a projector plane of one of projectors 110, or a virtual coordinate system.

Figure 2:
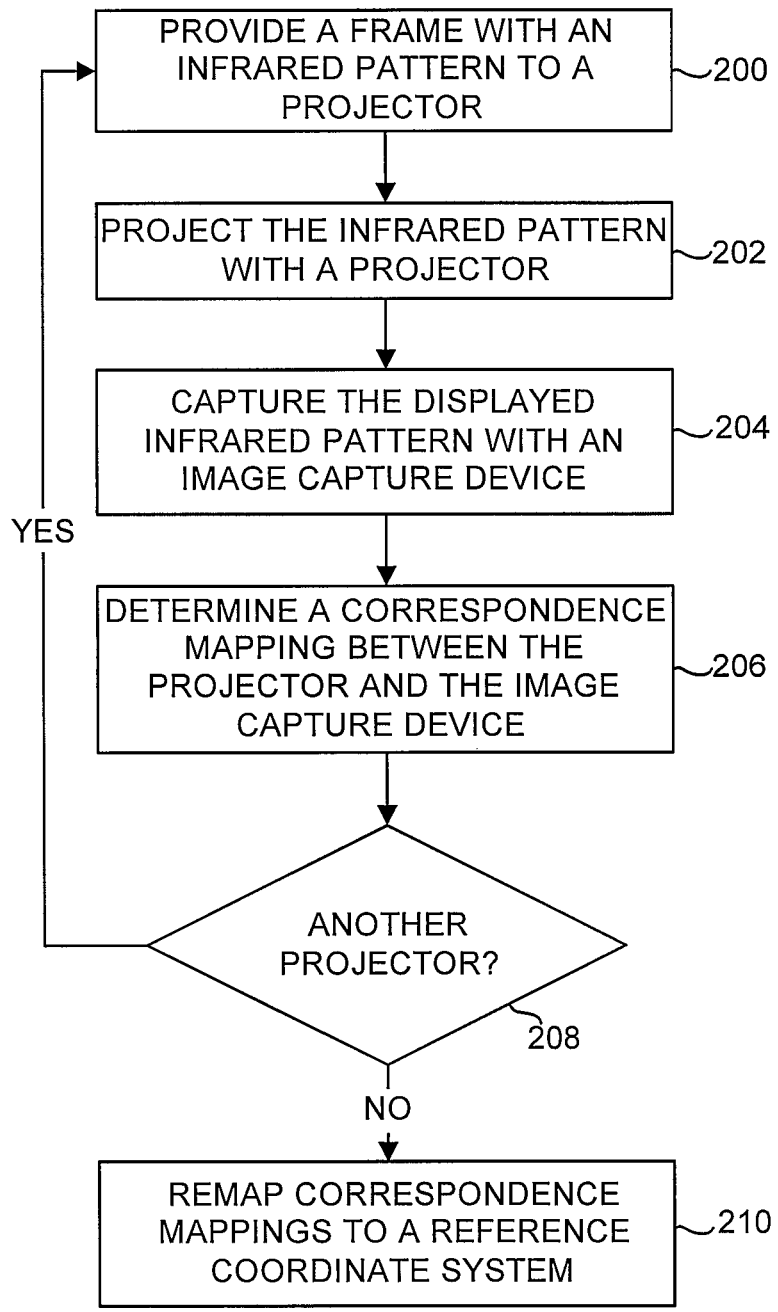
FIG. 2 is a flow chart illustrating an embodiment of a method for generating correspondence mappings using infrared patterns.

FIG. 2 is a flow chart illustrating an embodiment of a method for generating correspondence mappings using infrared patterns. The method of FIG. 2 will be described with reference to the embodiments of image display system 10 shown in FIGS. 1A and 1B.

In FIG. 2, processing system 100 provides a frame 136 with an infrared pattern 138 to a projector 110 as indicated in a block 200. Frame generation unit 104 may access stored frames 136 with patterns 138 from a memory (not shown) or may generate frames 136 with patterns 138. Each infrared pattern 138 may be any suitable arrangement of light symbols (e.g., space-time codes, binary or infrared patterns, blobs, or fiducial marks) formed in a frame 136 that are configured to be displayed with infrared light in a scene 130 by a projector 110. Each frame 136 is formed in the projection plane of a projector 110. Frame generation unit 104 causes frame 136 with infrared pattern 138 to be displayed by a projector 110 at a known time to allow the display of each infrared pattern 138 to be captured by image captured device 120 as described in additional detail below. Frame generation unit 104 stores or otherwise provides a copy of each frame 136 with an infrared pattern 138 to calibration unit 106 for use in determining a correspondence mapping as will be described in additional detail below.

Projector 110 projects infrared pattern 138 into a scene 130 as indicated in a block 202. In response to receiving frame 136 with infrared pattern 138 from processing system 100, projector 110 stores frame 136 in frame buffer 112. Projector 110 projects frame 136 from frame buffer 112 with infrared generation unit 114. Infrared generation unit 114 generates infrared light and causes infrared pattern 138 to be formed in scene 130 with the infrared light.

FIGS. 3A-3C are block diagrams illustrating embodiments of infrared generation unit 114.

FIG. 3A illustrates an embodiment 114A of infrared generation unit 114. In infrared generation unit 114A, a light source 302 generates visible and infrared light that is directed through optics 304 to a color wheel 306A. Color wheel 306A rotates about an axis that is in parallel with the optical and/or illumination path of projector 110. Different regions of color wheel 306A transmit different wavelengths of light from optics 304 as they rotate through the optical and/or illumination path of projector 110. Color wheel 306A includes at least one region 308 that is configured to transmit infrared light from light source 302. Color wheel 306A also includes other regions for transmitting other colors (e.g., red, green, and blue regions for transmitting red, green, and blue light, respectively). Visible and infrared light from color wheel 306A is provided to light modulator 310. Light modulator 310 modulates the visible light from color wheel 306A in accordance with frames 136 to form visual content in scene 130 and/or on display surface 140. Light modulator 310 modulates the infrared light from color wheel 306A in accordance with frames 136 with infrared patterns 138 to form infrared patterns in scene 130 and/or on display surface 140.

FIG. 3B illustrates an embodiment 114B of infrared generation unit 114. In infrared generation unit 114B, a color wheel 306B replaces color wheel 306A from infrared generation unit 114A (shown in FIG. 3A). Color wheel 306B rotates about an axis that is in parallel with the optical and/or illumination path of projector 110. Different regions of color wheel 306B transmit different wavelengths of light from optics 304 as they rotate through the optical and/or illumination path of projector 110. Color wheel 306B includes blanking regions 318 that are each configured to transmit infrared light from light source 302. Each blanking region 318 is formed between regions of color wheel 306B that are configured to transmit other colors. (e.g., between clear, red, green, and blue regions for transmitting white, red, green, and blue light, respectively). Visible and infrared light from color wheel 306B is provided to light modulator 310 which modulates the visible and infrared light as described above.

FIG. 3C illustrates an embodiment 114C of infrared generation unit 114. Infrared generation unit 114C includes a color wheel 306C and a controllable infrared (IR) blocking filter 328. Color wheel 306C transmits both visible and infrared light from optics 304 as it rotates about an axis that is in parallel with the optical and/or illumination path of projector 110. Different regions of color wheel 306C transmit different wavelengths of light from optics 304 as they rotate through the optical and/or illumination paths of projector 110 (e.g., clear, red, green, and blue regions for transmitting white, red, green, and blue light, respectively). Visible and infrared light from color wheel 306C is provided to controllable IR blocking filter 328. Controllable IR blocking filter 328 blocks infrared light and transmits visible light. Projector 110 operates controllable IR blocking filter 328 to block and transmit infrared light at appropriate times to allow infrared patterns 138 in frames 138 to be transmitted with infrared light to light modulator 310. Projector 110 may operate controllable IR blocking filter 328 by physically moving filter 328 into and out of the optical and/or illumination paths, by shuttering filter 328, or by creating a different optical path with filter 328. Light modulator 310 modulates the visible and infrared light from color wheel 306C as described above.

Although shown between color wheel 306C and light modulator 310 in the embodiment of FIG. 3C, controllable IR blocking filter 328 may be located between other components of infrared generation unit 114 in other embodiments.

The embodiments described with reference to FIGS. 3A-3C are provided by way of example. In other embodiments, blocks shown in FIGS. 3A-3C may be rearranged or omitted. For example, in embodiments of FIG. 3C where light modulator 310 is an LCD, color wheel 306C is omitted.

In another embodiment, one or more of projectors 110 may project only infrared light for use in 3-D media capture and interactive presentations.

Referring back to FIG. 2, image capture device 120 captures the displayed infrared pattern from scene 130 as indicated in a block 204. Image capture device 120 generates frames 120 that include infrared patterns 122 from scene 130. Each infrared pattern 122 forms a representation of the infrared pattern displayed in scene 130 in the capture plane of image capture device 120.

FIG. 4 is a block diagram illustrating an embodiment 120A of image capture device 120 configured to capture infrared patterns. In the embodiment of FIG. 4, image capture device 120A includes an infrared (IR) bandpass filter 402 that transmits infrared light from scene 130 and/or display surface 140 to optics 404. IR filter 402 also blocks visible light. Optics 404 focus the infrared light onto one or more sensors 406. Sensor 406 captures the infrared pattern displayed in scene 130 or on display surface 140. Additional circuitry (not shown) forms frames 120 from information captured by sensor 406, stores infrared patterns 122 in frames 120, and provides frames 120 to processing circuitry 100.

Calibration unit 106 determines a correspondence mapping 108 between projector 110 and image capture device 120 as indicated in a block 206. Calibration unit 106 compares infrared pattern 138 in frame 136 with infrared pattern 122 in frame 120 to determine correspondences between regions or pixels in the projector plane of projector 110 and regions or pixels in the capture plane of image capture device 120. Calibration unit 106 stores these correspondences as a correspondence mapping 108 for a projector 110.

FIG. 5 is a schematic diagram illustrating the determination of an embodiment 108A of a correspondence mapping 108 using infrared patterns. In the embodiment of FIG. 5, correspondence mapping 108A represents a correspondence mapping between a projector 110 and image capture device 120. Calibration unit 106 determines correspondences 506 between regions or pixels 504 in a projector plane coordinate system 502 of projector 110 and regions or pixels 514 in a capture plane coordinate system 512 of image capture device 120. Calibration unit 106 may determine correspondences 506 in any suitable way such as by mapping centroids or corners of portions of infrared patterns 138 to centroids or corners of portions of infrared patterns 122 or by using space-time codes formed in infrared patterns 122 and 138. Calibration unit 106 stores correspondences 506 as correspondence mapping 108A.

In one embodiment, the functions of blocks 200, 202, 204, and 206 may be repeated one or more times with the same or different codes for a given projector 110 to reduce the effect of temporal noise in determining correspondence mapping 108A.

A determination is made as to whether calibration is desired for another projector 100 in image display system 10 as indicated in a block 208. If calibration is desired for another projector in image display system 10, then the functions of blocks 200, 202, 204, and 206 are repeated for another projector 110. If calibration is not desired for another projector in image display system 10, then the method continues to block 210.

Calibration unit 106 remaps correspondence mappings 108A(1)-(N) to a reference coordinate system as indicated in a block 210. FIG. 6 is a schematic diagram illustrating the remapping of correspondence mappings 108A(1)-(N) to a reference coordinate system 532 to generate correspondence mappings 108B(1)-(N). In the embodiment of FIG. 6, each correspondence mapping 108B(1)-(N) represents a correspondence mapping between a projector 110 and reference coordinate system 532. Calibration unit 106 determines a set of correspondences 540(1)-(N) between each correspondence mapping 108A(1)-(N), respectively, and reference coordinate system 532. Calibration unit 106 stores the sets of correspondences 540(1)-(N) as correspondence mappings 108B(1)-(N), respectively.

The method described with reference to FIG. 2 may be performed at any suitable time during the operation of image display system 100. For example, the method may be performed continuously or periodically during normal operation (i.e., during the display of visual content) by image display system 100. The method may also be performed as part of a calibration process prior to or subsequent to the normal operation of image display system 100.

Using the embodiments of image display system 100 described above, system 100 may dynamically perform calibration during the display of visual content with no or minimal degradation in image quality of scene 130 and without a separate offline calibration process. The correspondence mappings generated by the calibration may be dense geometric mappings that may help determine visibility across projectors 100. The calibration process may be used with any arbitrary two or three dimensional display surface 140 (e.g., a planar surface, a curved surface, or multiple objects). In addition, the calibration process may be used to automatically adjust to changes in ambient conditions (e.g., heat) or set up conditions (e.g., fan vibrations affecting the projector bulbs and movement in the projector or camera set up). Further, the calibration process may be used to support any number of projectors 110 and image capture devices 120, and the calibration process scales linearly in computation through sequential calibration of projectors 110.

Image processing system 100 includes hardware, software, firmware, or a combination of these. In one embodiment, one or more components of image processing system 100 are included in a computer, computer server, or other microprocessor-based system capable of performing a sequence of logic operations. In addition, processing can be distributed throughout the system with individual portions being implemented in separate system components, such as in a networked or multiple computing unit environments.

Frame generation unit 104 and calibration unit 106 may be implemented in hardware, software, firmware, or any combination thereof and may be combined into a unitary processing system. For example, frame generation unit 104 and calibration unit 106 may include a microprocessor, programmable logic device, or state machine. Frame generation unit 104 and calibration unit 106 may also include software stored on one or more computer-readable mediums and executable by image processing system 100. The term computer-readable medium as used herein is defined to include any kind of memory, volatile or non-volatile, such as floppy disks, hard disks, CD-ROMs, flash memory, read-only memory, and random access memory.

Image frame buffer 102 includes memory for storing image data 102 for image frames 134. Thus, image frame buffer 102 constitutes a database of image frames 134. Image frame buffers 112 also include memory for storing any number of frames 136. Examples of image frame buffers 102 and 112 include non-volatile memory (e.g., a hard disk drive or other persistent storage device) and may include volatile memory (e.g., random access memory (RAM)).

Display surface 140 may be planar, non-planar, curved, or have any other suitable shape. In one embodiment, display surface 140 reflects the light projected by projectors 110 to form displayed scenes 130. In another embodiment, display surface 140 is translucent, and display system 10 is configured as a rear projection system.

In one embodiment, frames 136 have a lower resolution than image frames 134. Thus, frames 136 are also referred to herein as low-resolution images or frames 136, and image frames 134 are also referred to herein as high-resolution images or frames 134. The terms low resolution and high resolution are used herein in a comparative fashion, and are not limited to any particular minimum or maximum number of pixels.

In one embodiment, display system 10 produces at least a partially superimposed projected output that takes advantage of natural pixel mis-registration to provide a displayed image with a higher resolution than the individual frames 136. In one embodiment, image formation due to multiple overlapped projectors 110 is modeled by image processing system 100 using a signal processing model. Optimal frames 136 for each of the component projectors 110 are estimated by frame generation unit 104 based on the model, such that the resulting image predicted by the signal processing model is as close as possible to the desired high-resolution image to be projected. In one embodiment, frame generation unit 104 is configured to generate frames 136 based on the maximization of a probability that, given a desired high resolution image, a simulated high-resolution image that is a function of the sub-frame values, is the same as the given, desired high-resolution image. If the generated frames 136 are optimal, the simulated high-resolution image will be as close as possible to the desired high-resolution image.

In one embodiment, image display system 10 is configured to project images that have a three-dimensional (3D) appearance. In 3D image display systems, two images, each with a different polarization, are simultaneously projected by two different projectors. One image corresponds to the left eye, and the other image corresponds to the right eye. Conventional 3D image display systems may suffer from a lack of brightness. In contrast, with one embodiment, a first plurality of the projectors 110 may be used to produce any desired brightness for the first image (e.g., left eye image), and a second plurality of the projectors 110 may be used to produce any desired brightness for the second image (e.g., right eye image). In another embodiment, image display system 100 may be combined or used with other display systems or display techniques, such as tiled displays.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a display system, the method comprising:
    providing, to a first projector, an input of a first infrared pattern combined with a first portion of visual content;
    projecting, with the first projector, the first portion of the visual content onto a display surface for viewing by a human observer;
    projecting, with the first projector, the first infrared pattern from a first projection plane of the first projector onto the display surface during the projection of the first portion of the visual content by the first projector;
    capturing the first infrared pattern from the display surface in a capture plane of at least one image capture device having an infrared filter configured to transmit the first infrared pattern and block the visual content; and
    determining a first correspondence mapping between the first projector and the image capture device from at least the first infrared pattern in the first projection plane and the first infrared pattern in the capture plane.

2. The method of claim 1 further comprising:
    providing, to a second projector, an input of a second infrared pattern combined with a second portion of the visual content;
    projecting, with the second projector, the second portion of the visual content onto the display surface for viewing by the human observer;
    projecting, with the second projector, the second infrared pattern from a second projection plane of the second projector onto the display surface during the projection of the second portion of the visual content by the second projector;

capturing the second infrared pattern from the display surface in the capture plane of the image capture device, the infrared filter configured to transmit the second infrared pattern; and determining a second correspondence mapping between the second projector and the image capture device from at least the second infrared pattern in the second projection plane and the second infrared pattern in the capture plane.

3. The method of claim 2 further comprising:

projecting the first infrared pattern onto a region of the display surface at a first time; and projecting the second infrared pattern onto at least a portion of the region at a second time that is subsequent to the first time.

4. The method of claim 2 further comprising:

remapping the first and the second correspondence mappings to a reference coordinate system.

5. The method of claim 1 further comprising:

generating a frame for display onto the display surface by the first projector with the first correspondence mapping.

6. The method of claim 1 wherein the first infrared pattern is substantially visually imperceptible to the human observer while viewing the visual content.

7. The method of claim 1 wherein the first infrared pattern includes a space-time code.

8. The method of claim 1 wherein the input of the first infrared pattern combined with the first portion of visual content comprises a single input to the first projector.

9. An image display system comprising:

a processing system;

a first projector with a first projection plane;

at least one image capture device with a capture plane and an infrared filter configured to transmit infrared light and block visual content;

wherein the first projector is configured to project a first portion of visual content onto a display surface for viewing by a human observer, wherein the first projector is configured to project a first pattern onto the display surface with first infrared light during the projection of the first portion of the visual content by the first projector, wherein the infrared filter is configured to transmit the first infrared light and the image capture device is configured to capture the first pattern from the display surface, wherein the processing system is configured to determine a first correspondence mapping between the first projector and the image capture device from at least the first pattern in the first projection plane and the first pattern in the capture plane, wherein the processing system is configured to provide to the first projector a combined input of the first pattern with the first portion of the visual content.

10. The image display system of claim 9 wherein the first projector includes a color wheel with a region configured to transmit the first infrared light.

11. The image display system of claim 9 wherein the first projector includes a color wheel with a plurality of blanking regions that are configured to transmit the first infrared light.

12. The image display system of claim 9 wherein the first projector includes a controllable infrared blocking filter.

13. The image display system of claim 9 further comprising:

a second projector with a second projection plane;

wherein the second projector is configured to project a second portion of the visual content onto the display surface for viewing by the human observer, wherein the second projector is configured to project a second pattern onto the display surface with second infrared light during the projection of the second portion of the visual content by the second projector, wherein the infrared filter is configured to transmit the second infrared light and the image capture device is configured to capture the second pattern from the display surface, wherein the processing system is configured to determine a second correspondence mapping between the second projector and the image capture device from at least the second pattern in the second projection plane and the second pattern in the capture plane, and wherein the processing system is configured to provide to the second projector a combined input of the second pattern with the second portion of the visual content.

14. The image display system of claim 9 wherein the combined input of the first pattern with the first portion of the visual content comprises a single input to the first projector.

15. A non-transitory computer-readable medium comprising:

a program executable by a processing system for causing an image display system to:

project, with a first projector, at least a first portion of visual content onto a display surface for viewing by a human observer;

project, with the first projector, a first infrared pattern from a first projection plane of the first projector onto the display surface during the projection of the first portion of the visual content by the first projector, the first infrared pattern and the first portion of the visual content provided to the first projector as a single input;

capture the first infrared pattern from the display surface in a capture plane of at least one image capture device having an infrared filter configured to transmit the first infrared pattern and block the visual content; and determine a first correspondence mapping between the first projector and the image capture device from at least the first infrared pattern in the first projection plane and the first infrared pattern in the capture plane; and a medium for storing the program.

16. The non-transitory computer-readable medium of claim 15 wherein the program is executable by the processing system for causing the processing system to:

project, with a second projector, at least a second portion of the visual content onto the display surface for viewing by the human observer;

project, with the second projector, a second infrared pattern from a second projection plane of a second projector onto the display surface during the projection of the second portion of the visual content by the second projector, the second infrared pattern and the second portion of the visual content provided to the second projector as a single input;

capture the second infrared pattern from the display surface in the capture plane of the image capture device, the infrared filter configured to transmit the second infrared pattern; and determine a second correspondence mapping between the second projector and the image capture device from at least the second infrared pattern in the second projection plane and the second infrared pattern in the capture plane.

17. The non-transitory computer-readable medium of claim 15 wherein the first infrared pattern is substantially visually imperceptible the human observer while viewing the visual content.

18. The non-transitory computer-readable medium of claim 15 wherein the first infrared pattern includes a space-time code.

19. The non-transitory computer-readable medium of claim 15 wherein the single input of the first infrared pattern and the first portion of the visual content comprises a combined input of the first pattern together with the first portion of the visual content to the first projector.

* * * * *